United States Patent
Monajemi et al.

(10) Patent No.: US 12,262,210 B2
(45) Date of Patent: *Mar. 25, 2025

(54) DYNAMIC CONFIGURATION OF OVERLAPPING BASIC SERVICE SET PREAMBLE DETECT (OBSS PD) PARAMETERS FOR ACCESS POINTS

(71) Applicant: Cisco Technology, Inc., San Jose, CA (US)

(72) Inventors: Pooya Monajemi, San Jose, CA (US); Benjamin Jacob Cizdziel, San Jose, CA (US); Vishal Satyendra Desai, San Jose, CA (US)

(73) Assignee: Cisco Technology, Inc.

( * ) Notice: Subject to any disclaimer, the term of this patent is extended or adjusted under 35 U.S.C. 154(b) by 190 days.

This patent is subject to a terminal disclaimer.

(21) Appl. No.: 18/184,291

(22) Filed: Mar. 15, 2023

(65) Prior Publication Data

US 2023/0217258 A1 Jul. 6, 2023

Related U.S. Application Data

(63) Continuation of application No. 17/155,974, filed on Jan. 22, 2021, now Pat. No. 11,611,884.

(51) Int. Cl.
*H04W 16/10* (2009.01)
*H04B 17/318* (2015.01)
(Continued)

(52) U.S. Cl.
CPC .......... *H04W 16/10* (2013.01); *H04B 17/318* (2015.01); *H04B 17/336* (2015.01); *H04W 24/02* (2013.01)

(58) Field of Classification Search
None
See application file for complete search history.

(56) References Cited

U.S. PATENT DOCUMENTS 10,251,123 B2 4/2019 Desai et al.
10,701,627 B2 6/2020 Desai et al.
(Continued)

FOREIGN PATENT DOCUMENTS

WO 2018164711 A1 9/2018

OTHER PUBLICATIONS

Ioannis Selinis et al., Control OBSS/PD Sensitivity Threshold for IEEE 802.11ax BSS Color, 2018 IEEE 29th Annual International Symposium on Personal, Indoor, and Mobile Radio Communications (PIMRC), Sep. 2018, 7 pages.

(Continued)

*Primary Examiner* — Faruk Hamza
*Assistant Examiner* — Cassandra L Decker
(74) *Attorney, Agent, or Firm* — Merchant & Gould P.C.

(57) ABSTRACT

Dynamic configuration of Overlapping Basic Set Service Preamble Detect (OBSS/PD) parameters for an Access Point (AP) may be provided. First, a plurality of stations within a Spatial Reuse (SR) range of the AP may be determined. Next, Signal to Interference plus Noise Ratio (SINR) calculations associated with the plurality of stations may be performed to determine an SINR impact on the plurality of stations if the AP performs an SR transmission given OBSS/PD parameters currently configured for the AP. Then, based on the SINR calculations, the OBSS/PD parameters for the AP may be dynamically adjusted.

20 Claims, 5 Drawing Sheets

(51) Int. Cl.
*H04B 17/336* (2015.01)
*H04W 24/02* (2009.01)

(56) References Cited

U.S. PATENT DOCUMENTS

| | | |
|---|---|---|
| 10,736,143 B2 | 8/2020 | Bhanage et al. |
| 2015/0078299 A1 | 3/2015 | Barriac et al. |
| 2017/0245224 A1 | 8/2017 | Barriac et al. |
| 2019/0191385 A1 | 6/2019 | Shinohara et al. |
| 2020/0288323 A1 | 9/2020 | Silverman et al. |
| 2021/0051664 A1 | 2/2021 | Bhattacharya et al. |
| 2021/0360419 A1 | 11/2021 | Choi et al. |
| 2021/0360691 A1 | 11/2021 | Haider et al. |
| 2021/0360694 A1 | 11/2021 | Pandian et al. |
| 2022/0240097 A1 | 7/2022 | Monajemi et al. |

OTHER PUBLICATIONS

Oni Phillip B et al: "AP Association Optimization and CCA Threshold Adjustment in Dense WLANs", 2015 IEEE Globecon Workshops (GC Wkshps), IEEE, Dec. 6, 2015, pp. 1-6.
International Search Report and Written Opinion issued in corresponding International Patent Application No. PCT/US2022/013150, May 2, 2022.

DYNAMIC CONFIGURATION OF OVERLAPPING BASIC SERVICE SET PREAMBLE DETECT (OBSS PD) PARAMETERS FOR ACCESS POINTS

RELATED APPLICATION

This application is a continuation of U.S. patent application Ser. No. 17/155,974 filed Jan. 22, 2021, the disclosure of which is incorporated herein by reference in its entirety.

TECHNICAL FIELD

The present disclosure relates generally to dynamically configuring Overlapping Basic Service Set Preamble Detect (OBSS/PD) parameters of an Access Point (AP) for spatial reuse based on Signal to Interference plus Noise Ratio (SINR) measurements.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

An AP connects to a wired network, and then provides Radio Frequency (RF) links (e.g., channels) for other radio devices, such as clients associated with that AP, to reach that wired network. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
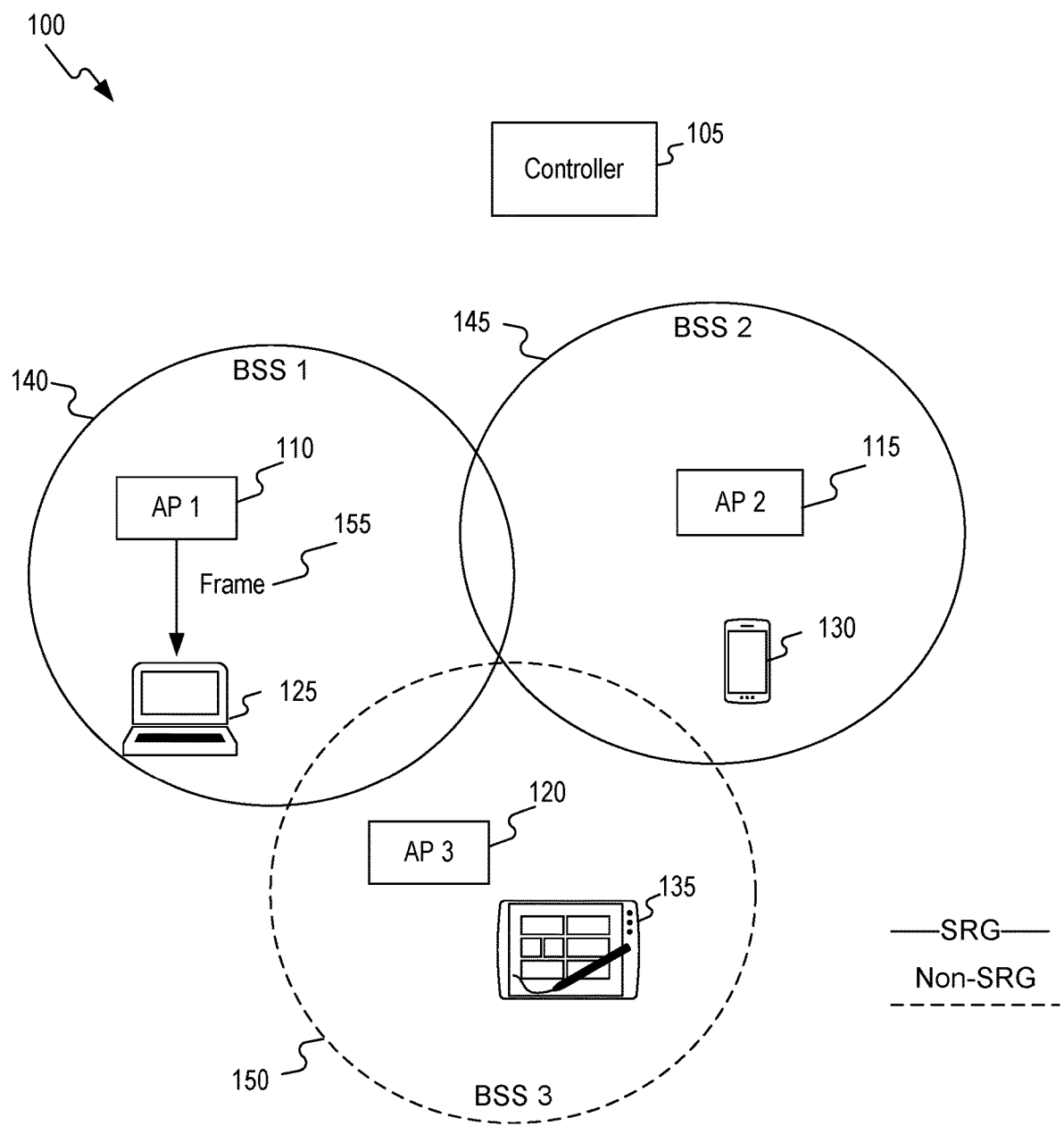
FIG. 1 is a block diagram of wireless network.

Dynamic configuration of Overlapping Basic Service Set Preamble Detect (OBSS/PD) parameters for an Access Point (AP) may be provided. First, a plurality of stations within a Spatial Reuse (SR) range of the AP may be determined. Next, Signal to Interference plus Noise Ratio (SINR) calculations associated with the plurality of stations may be performed to determine an SINR impact on the plurality of stations if the AP performs an SR transmission given OBSS/PD parameters currently configured for the AP. Then, based on the SINR calculations, the OBSS/PD parameters for the AP may be dynamically adjusted.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A feature of Institute of Electrical and Electronics Engineers (IEEE) 802.11ax, also referred to as Wi-Fi 6, provides for Overlapping Basic Service Set Preamble Detect (OBSS/PD)-based Spatial Reuse (SR) transmission. This SR transmission feature of Wi-Fi 6 allows stations (e.g., Access Points (APs) and clients) to have more Transmit Opportunities (TxOPs) in dense Wide Local Area Network (WLAN) environments comprising a large number of physically proximate APs to serve a large number of clients.

As one example, if a first packet received over a channel by an AP is determined to be an OBSS packet (e.g., determined to originate from another AP forming a different BSS from the AP) and a Received Signal Strength Indicator (RSSI) value of the packet is below an OBSS/PD threshold value set for the AP, the AP may perform an SR transmission over the same channel. As part of the SR transmission, a frame originating at the AP may be transmitted to a client associated with the AP over the same channel instead of having to defer transmission (e.g., it may be transmitted over the first OBSS packet). Clients may also perform SR transmissions. However, for purposes of this disclosure, the performance of SR transmissions by an AP and corresponding dynamic configuration of OBSS/PD parameters for the AP will be described.

While utilization of this feature has the potential to increase throughput and reduce latency of the WLAN, it also has the potential to cause interference upon the intended receiver of the first OBSS packet (e.g., a client associated to the AP forming the different BSS), which may cause its reception to fail.

Embodiments described herein provide for dynamic configuration of OBSS/PD parameters used to compute the OBSS/PD threshold for APs of a network to reduce the potential for interference, while still achieving performance benefits such as increased throughput and reduced latency provided by SR. The dynamic configuration of the OBSS/PD parameters of an AP may be based on a calculated Signal to Interference plus Noise Ratio (SINR) that other network stations (e.g., clients and APs) within a SR range of the AP would experience in the presence of an SR transmission by the AP.

FIG. 1 shows a block diagram of wireless network 100. As shown in FIG. 1, network 100 may be a WLAN comprising a controller 105 and a plurality of APs, such as first AP 110, second AP 115, and third AP 120. Controller 105 may be a WLAN controller that manages and configures the APs of network 100. The APs may be networking hardware devices that enable other devices, such as clients, to connect to network 100. As illustrated, clients of network 100 may include a first client 125, a second client 130, and a third client 135. Clients may comprise, but are not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network. One controller, three APs, and three clients are shown in FIG. 1 for illustrative purposes; however, a plurality of controllers, APs, and clients may be used in conjunction with network 100. Additionally, other network management entities may be used in conjunction with network 100.

First client 125 may be associated with first AP 110 to connect to network 100, where first AP 110, first client 125, and any other clients associated with first AP 110 may form a first Basic Service Set (BSS) 140. Second client 130 may be associated with second AP 115 to connect to network 100, where second AP 115, second client 130, and any other clients associated with second AP 115 form a second BSS 145. Third client 135 may be associated with third AP 120 to connect to network 100, where third AP 120, third client 135, and any other clients associated with third AP 120 form a third BSS 150. Each of first BSS 140, second BSS 145, and third BSS 150 may be an OBSS to one another (e.g., first BSS 140 is an OBSS to second BSS 145). In some examples, first BSS 140 and second BSS 145 may form a Spatial Reuse Group (SRG) with one or more other BSS. Third BSS 150 may not belong to the SRG that first BSS 140 and second BSS 145 form.

As illustrated, first AP 110 may be transmitting a frame 155 to first client 125 over a channel. In one example, first AP 110 and first client 125 may be within a SR range of second AP 115. Resultantly, second AP 115 may be capable of performing an SR transmission to transmit a separate frame (e.g., an SR frame) to second client 130 at a same time and over the same channel that first AP 110 is transmitting frame 155 to first client 125.

One or more OBSS/PD parameters for second AP 115, at least some of which are implemented in an OBSS threshold computation to determine whether second AP 115 may proceed with or should defer the SR transmission, may be dynamically configured to optimize SR to achieve maximum performance benefits while minimizing interference. For example, as described in greater detail below with respect to FIG. 2, FIG. 3, and FIG. 4, the OBSS parameters may be dynamically configured for second AP 115 based on a determined SINR impact on stations within the SR range of second AP 115, such as first client 125 and first AP 110, in the presence of an SR transmission between second AP 115 and second client 130 given OBSS parameters currently configured for second AP 115. In some embodiments, dynamic OBSS PD parameter configuration for an AP may be performed by the AP itself (e.g., second AP 115). In other embodiments, dynamic OBSS PD parameter configuration may be performed by controller 105 or any other network management entity.

The configurable OBSS/PD parameters for an AP may include whether OBSS/PD-based SR is enabled or disabled, an OBSS/PD maximum value, and an OBSS/PD minimum value. For purposes of this disclosure, it may be assumed that OBSS/PD-based SR will be enabled. In some examples, the OBSS/PD parameters may include two sets of OBSS/PD maximum and minimum values. A first set may include SRG OBSS/PD maximum and minimum values that may be applied when the AP would be performing an SR transmission over an OBSS packet originating from a BSS within a same SRG as the BSS of AP (e.g., if second AP 115 of second BSS 145 performs SR transmission over OBSS packet originating from first BSS 140). For the first set, both the minimum and maximum values may be configured such that a more aggressive OBSS threshold is computed to enable more instances of SR transmission to occur. A second set may include non-SRG maximum and minimum values that may be applied when the AP would be performing an SR transmission over an OBSS packet originating from a BSS that is not in a SRG group of the BSS of AP (e.g., if second AP 115 of first BSS 140 performs SR transmission over OBSS packet originating from third BSS 150). For the second set, only the maximum value may be dynamically configurable and the minimum value may be a default value.

To provide an illustrative example of how the dynamically configured OBSS/PD parameters for second AP 115 are then implemented, first AP 110 and first client 125 may be operating on a same primary channel as second AP 115 and second client 130. Therefore, when first AP 110 transmits frame 155 to first client 125 over the channel, second AP 115 may receive a packet corresponding to frame 155 (e.g., a packet comprising frame 155). Second AP 115 first determines whether or not the packet is an OBSS packet. In some examples, to determine whether packet is an OBSS packet, second AP 115 may identify a BSS color value in a physical (PHY) header of the packet and compare the identified BSS color value to its own BSS color value (e.g., a BSS color value for second BSS 145). If the color values are different, then the packet is an OBSS packet. Here, because the packet originated in first BSS 140, the BSS color value may be a value for first BSS 140, and thus the color values will be different. In other examples, to determine whether the packet is an OBSS packet, second AP 115 may identify a BSS Identifier (BSSID) in the packet, which may be a MAC address of an AP (e.g., first AP 110) that transmitted the packet. On the other hand, if the packet was identified to not be an OBSS packet (e.g., if it was instead a packet originating from another AP or client in second BSS 145), second AP 115 may defer transmission to second client 130.

Based on the packet being identified as an OBSS packet, second AP 115 may obtain an RSSI value from the packet, and compare to an OBSS/PD threshold value of second AP 115. The OBSS/PD threshold value of second AP 115 may be based on the dynamically configured OBSS/PD maximum and minimum values and a transmit power of second AP 115. Here, because first BSS 140 and second BSS 145 are in a same SRG, the first set of dynamically configured SRG maximum and minimum values may be applied in the OBSS/PD threshold computation.

If the RSSI value is below the OBSS/PD threshold value of second AP 115, second AP 115 may perform SR transmission to second client 130. Otherwise, if the RSSI value is at or above the OBSS/PD threshold value of second AP 115, second AP 115 may defer transmission.

The elements described above of network 100 (e.g., controller 105, first AP 110, second AP 115, and third AP 120) may be practiced in hardware and/or in software (including firmware, resident software, micro-code, etc.) or in any other circuits or systems. The elements of network 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of network 100 may also be practiced using other technologies capable of performing logical operations such as, for example, AND, OR, and NOT, including but not limited to, mechanical, optical, fluidic, and quantum technologies. As described in detail below with respect to FIG. 5, the elements of network 100 may be practiced in a computing device 500.

Figure 2:
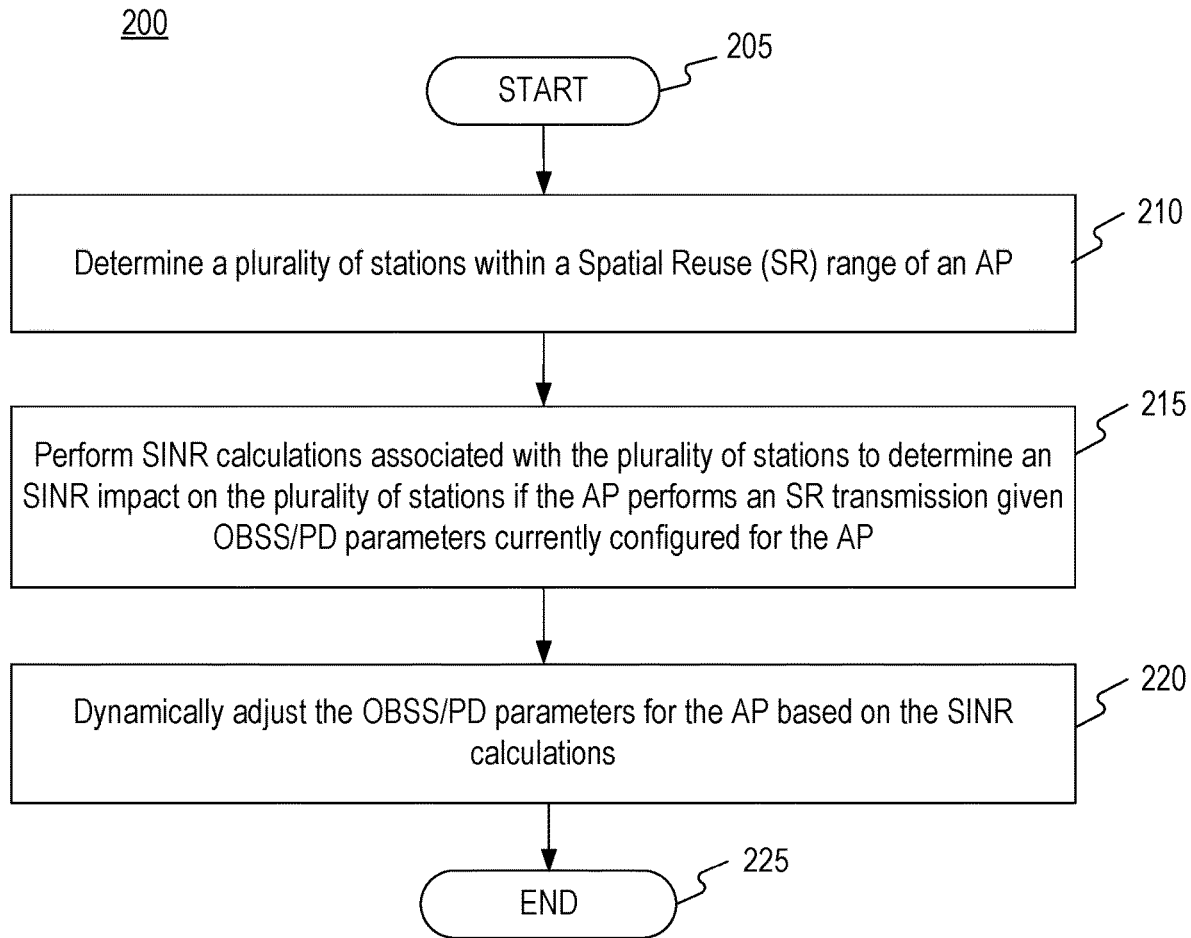
FIG. 2 is a flow chart of a method for dynamically configuring Overlapping Basic Service Set Preamble Detect (OBSS/PD) parameters for an Access Point (AP)

FIG. 2 is a flow chart setting forth the general stages involved in a method 200 consistent with embodiments of the disclosure for dynamically configuring OBSS/PD parameters for an AP, such as second AP 115. Method 200 may be implemented using computing device 500 (e.g., second AP 115 or controller 105 or any other network management entity) as described in more detail below with respect to FIG. 5. Ways to implement the stages of method 200 will be described in detail below.

Method 200 may begin at starting block 205 and proceed to stage 210, where a plurality of stations within a SR range of an AP may be determined. For example, if OBSS/PD parameters of second AP 115 are being dynamically configured, first AP 110 and first client 125, among other stations, may be determined to be within the SR range of second AP 115. The determination may be made based on RSSI metrics for each station collected from a variety of sources, where the plurality of stations determined may be associated with an RSSI value that falls within the SR range.

In some examples, RSSI metrics may include AP to AP RSSI values. A Neighbor Discovery Protocol (NDP) frame transmitted by an AP to neighboring APs may include information about the transmission power of the transmitting AP (e.g., a first power). A neighboring AP that receives the NDP frame from the transmitting AP can then use this information about the first power, along with knowledge of a second power at which the neighboring AP received the NDP frame to calculate a path loss. As one example, first AP 110 may be the transmitting AP that transmits the NDP frame to second AP 115, among other neighboring APs. The NDP frame may indicate that first AP 110 transmitted the NDP frame at 20 decibel-milliwatts (dBm), and second AP 115 may receive the NDP frame at −60 dBM. Therefore, the path loss may be 80 dBm. An RSSI value may then be determined based on calculated path loss and transmit powers used by the neighboring AP.

In further examples, RSSI metrics may include AP to client RSSI values (e.g., Downlink (DL) RSSI values). The DL RSSI values may be obtained from beacon reports generated by the clients. For example, first client 125 associated with first AP 110 may generate and transmit a beacon report to first AP 110, where the beacon report indicates how strongly (e.g., based on RSSI values indicating signal power) first client 125 may hear signals from first AP 110 as well as other APs within range of first client 125. In some examples, first client 125 may include an RSSI value indicating how strongly it may hear signals from second AP 115. Additionally, if first AP 110 and second AP 115 are coordinating over a network controller, such as controller 105, the beacon reports and/or relevant information therein may be communicated between first AP 110 and second AP 115.

In other examples, if the beacon report generated by first client 125 does not include the RSSI value indicating how strongly it may hear second AP 115, other means for deriving the RSSI value may be employed. As one example, a frame transmitted from first client 125 to first AP 110 (e.g., an Uplink (UL) transmission) that second AP 115 heard may be identified. Based on a RSSI value indicating how strongly second AP 115 heard the frame on the UL and a transmit power of first client 125; a path loss on the UL may be determined. In some examples, the transmit power of first client 125 may be obtained directly from first client 125 (e.g., if first client 125 reports the transmit power it is using). In other examples, first AP 110 may use a DL RSSI value from first AP 110 to first client 125 (e.g., that is indicated in a beacon report generated and transmitted by the first client 125 to first AP 110) along with the transmit power of AP 124 to determine what the DL path loss is and then from UL transmission may figure out client transmit power. Assuming the path loss on the UL is the same on the DL, the path loss on the DL may be reversed using a transmission power of second AP 115 to determine a DL RSSI value from second AP 115 to first client 125.

In yet further examples, RSSI metrics may include client to AP RSSI values (e.g., UL RSSI values). In some examples, the UL RSSI values may be obtained from probe requests sent from the clients to respective APs. In other examples, the UL RSSI values may be obtained from packets transmitted from the clients to the respective APs.

The SR range may have an upper bound of −62 dBM and a configurable lower bound. In some examples, the lower bound may be a default value of −82 dBM. In other examples, the lower bound may be configured to be lower than the default value (e.g., may be configured to be −85 dBM or −90 dBM, among other examples). Therefore, any station (e.g., any client or AP) associated with RSSI metrics that fall within the SR range may be determined and method 200 may advance to stage 215. For example, if the SR range is from −62 dBM to −82 dBM, then the determined plurality of stations may include any client and any AP that hears signals from second AP (e.g., that receives signals having a signal power) between −62 dBM to −82 dBM.

At stage 215, SINR calculations associated with the plurality of stations may be performed. Generally, the SINR calculations are performed to determine an SINR impact on each of the stations within the SR range of the AP if the AP performs an SR transmission with a client given OBSS/PD parameters currently configured for the AP. For example, an SINR impact in both UL and DL directions may be determined on first client 125 and its associated first AP 110 if second AP 115 performs an SR transmission with second client 130.

A DL SINR impact may be quantified as a DL SINR value measured at the client's location. The DL SINR value may be calculated using a first RSSI value that indicates a signal power at which the client receives an intended frame from its associated AP (e.g., RSSI of intended non-SR frame) and a second RSSI value that indicates an interference power generated at the client if second AP 115 performs the SR transmission (e.g., RSSI of OBSS SR frame). For example, the DL SINR value may be calculated as follows:

*DL* SINR=*DL* RSSI of intended non-*SR* frame/(RSSI of OBSS *SR* frame+noise), where, if the client is first client 125, the DL RSSI value of the intended non-SR frame is a DL RSSI value of frame 155 transmitted from first AP 110 to first client 125, the RSSI value of the OBSS SR frame is an RSSI value of a frame transmitted from the second AP 115 during SR transmission that is heard by first client 125 (e.g. an SR-frame), and noise may be a constant value (e.g., thermal noise) and/or may be based on other environmental noise factors.

The DL RSSI value of the intended non-SR frame may be computed based on a DL RSSI value reported in a beacon report generated by first client 125 and an estimate of mean gains from first AP 110 beamforming. For example, when transmitting frame 155 to first client 125, first AP 110 may use beamforming to focus signals toward first client 125, rather than having the signals spread in all directions from a broadcast antenna (e.g., referred to a omnidirectional transmission). First AP 110 has multiple antennas, and to beamform, a matrix may be computed and applied to the transmission such that signals transmitted out of each antenna of first AP 110 may be slightly different to create a pattern of constructive and destructive interference so that once the signals arrive at first client 125, the signals are combined in a way where the expected pattern of radiation is preferentially observed to. With a knowledge of how many antennas first AP 110 and first client 125 have, first AP 110 may estimate an average strength gained (e.g., in dBm) when transmitting signals using beamforming versus omnidirectional transmission.

The RSSI of OBSS SR frame may be obtained from the beacon report generated by first client 125 indicating how strongly first client 125 hears second AP 115 (e.g., a signal power at which first client 125 receives signals from second AP 115). In other examples, if the beacon report generated by first client 125 does not include the RSSI value indicating how strongly it may hear second AP 115, other means for deriving the RSSI value may be employed as described above with reference to stage 210.

A UL SINR impact may be quantified as a UL SINR value measured at the AP's location, such as first AP 110 to which first client 125 is associated. The UL SINR value may be calculated using a first UL RSSI value that indicates a signal power at which the AP receives an intended frame from an associated client (e.g., RSSI of intended non-SR frame) and a second RSSI value that indicates an interference power generated at the AP if second AP 115 performs the SR transmission (e.g., RSSI of OBSS SR frame). For example, the UL SINR value may be calculated as follows:

$$UL\ SINR = UL\ RSSI\ \text{of intended non-}SR\ \text{frame}/(RSSI\ \text{of OBSS}\ SR\ \text{frame}+\text{noise}),$$

where, if the AP is first AP 110, the UL RSSI value of the intended non-SR frame is a UL RSSI value of a frame transmitted from first client 125 to first AP 110, the RSSI value of the OBSS SR frame is an RSSI value of the frame transmitted from the second AP 115 during SR transmission that is heard by first AP 110 (e.g., an AP to AP RSSI value), and noise may be a constant value (e.g., thermal noise) and/or may be based on other environmental noise factors.

The RSSI value of the frame transmitted from first client 125 to first AP 110 may be a UL RSSI value obtained from the frame itself that was transmitted from first client 125 to first AP 110 (e.g., the UL RSSI value as measured by first AP 110). The RSSI value of the frame transmitted from the second AP 115 during SR transmission that is heard by first AP 110 (e.g., the AP to AP RSSI value) may be obtained using NDP or other measurements.

In one embodiment, described in greater detail with reference to FIG. 3 below, the above-described SINR calculations may be performed for each of the plurality of stations (e.g., for each client and its associated AP) determined to be within the SR range of the AP for which the OBSS/PD parameters are being dynamically configured. This embodiment may also be referred to herein as the per-station method.

In another embodiment, described in greater detail with reference to FIG. 4 below, a statistical approach may be applied that determines a distribution of the RSSI values for each of the variables within the SINR calculation across the plurality of stations (e.g., a distribution of RSSI values of intended non-SR frames and a distribution of RSSI values of OBSS SR frames for in-range stations) and obtains one value from each distribution to input for each variable to calculate the SINR. In other words, only one SINR calculation is performed across the in-range stations. This other embodiment may be referred to herein as the statistical method. By not having to perform an SINR calculation for each in-range client and its associated AP, the amount of computational processing required is significantly decreased, which correspondingly increases the speed at which the SINR calculation may be performed.

Once the SINR calculations are performed at stage 215, method 200 may advance to stage 220, where the OBSS/PD parameters for the AP (e.g., for second AP 115) are dynamically adjusted based on the SINR calculations. As previously discussed, the OBSS/PD parameters may include enablement or disablement of OBSS/PD, SRG OBSS/PD maximum and minimum values, and/or non-SRG OBSS/PD maximum and minimum values. For purposes of this application, the adjustment may be focused on the maximum and minimum OBSS/PD values as it is assumed the OBSS/PD will remain enabled given performance benefits that can be achieved through SR transmission. In some examples, both maximum and minimum OBSS/PD values may be adjusted as part of the dynamic configuration (e.g., for the SRG OBSS/PD maximum and minimum values). In other examples, only maximum OBSS/PD value may be adjusted as part of the dynamic configuration while the minimum OBSS/PD value remains a default value (e.g., for non-SRG OBSS/PD maximum and minimum values).

Based on the SINR calculations, a determination is made whether to adjust the OBSS/PD parameters currently configured for second AP 115. The determination may be made based at least in part on a target SINR level or value. The target SINR level or value may be predefined and based on an acceptable level of interference or impact on in-range stations when balanced against the performance benefits achieved by enabling second AP 115 to perform SR transmission.

For example, given the OBSS/PD parameters currently configured for second AP 115, if the SINR impact on the in-range stations when second AP 115 performs an SR transmission identified by the SINR calculations is below the target SINR level (e.g., the ratio of signal to interference is lower than the target), then the OBSS/PD parameters may be adjusted. For example, the OBSS/PD parameters may be adjusted to be more conservative and restrict a number of instances of SR transmission that may occur to decrease interference experienced by the in-range stations. Conservative adjustment may include lowering the maximum value closer to the minimum value. For example, if the current OBSS/PD parameters include maximum and minimum values of −62 dBM and −82 dBM, respectively, the maximum value of −62 dBm may be adjusted closer to the minimum value of −82 dBM (e.g., adjusted to a value of −70 dBm). Alternatively, if the SINR impact is above the target SINR level (e.g., the ratio of signal to interference is higher than the target), then the OBSS/PD parameters may be adjusted to be more aggressive and allow more instances of SR transmission to occur because additional interference on the stations may be acceptable in view of the benefits that will be achieved by enabling more SR transmissions. For example, the minimum value may be raised closer or equal to the maximum value. Continuing the same example above, where the current OBSS/PD parameters include maximum and minimum values of −62 dBM and −82 dBM, the adjustment may set both the maximum and minimum values at −62 dBm. In further examples, if the SINR impact is equal to target SINR value, then the OBSS/PD parameters may be maintained rather than adjusted.

Method 200 may then end at stage 225.

In some examples, the dynamic configuration (e.g., adjustment) of the OBSS/PD parameters may be performed periodically at configurable, predefined intervals. In other examples, the dynamic configuration may be event-based in response to one or more measured changes in performance of network 100. Exemplary changes that may trigger the dynamic configuration include error rate increases, throughput changes, and/or interference-related statistics on SR transmissions received from APs of network 100.

The adjusted OBSS/PD parameters for the AP (e.g., second AP 115) may be stored at the AP for use in SR transmission decisions. For example, to determine whether second AP 115 is to perform an SR transmission over an OBSS packet transmission, the adjusted OBSS/PD parameters may be retrieved from storage and implemented, along with a transmit power of second AP 115 to compute an OBSS/PD threshold.

For example, the OBSS/PD threshold may be computed as follows:

$$OBSS/PD \geq \max(OBSS/PD_{min}, \min(OBSS/PD_{max}, OBSS/PD_{min} + (TX\_PWR_{ref} - TX\_PWR))),$$

where one or more of $OBSS/PD_{min}$ and $OBSS/PD_{max}$ are the dynamically configured OBSS/PD minimum and maximum values, respectively, the reference power ($TX\ PWR_{ref}$) is set to 21 or 25 dBm based on a number of spatial streams of the AP (e.g., 21 dBM if less than 2 spatial streams, 25 dBm if 2 or more spatial streams), and TX PWR is the transmission power of the AP in dBm. If the OBSS packet is associated with (e.g., is being transmitted by) an AP within a same SRG as second AP 115, $OBSS/PD_{min}$ and $OBSS/PD_{max}$ may be the SRG minimum and maximum values, where one or both of the minimum and maximum may have been dynamically configured. Otherwise, $OBSS/PD_{min}$ and $OBSS/PD_{max}$ may be the non-SRG minimum and maximum values, where only the maximum value may have been dynamically configured.

In some examples, multiple different thresholds may be computed from each neighboring AP of second AP 115. In such examples, a most conservative (e.g., a lowest value) may be selected as the OBSS/PD threshold value. For example, if one neighboring AP computes an OBSS/PD threshold value of −72 dBm and another neighboring AP computes an OBSS/PD threshold value of −75 dBm, the more conservative, lower OBSS/PD threshold value of −75 dBm is selected.

If an obtained RSSI value of the OBSS packet is below the computed OBSS/PD threshold value, second AP 115 may perform the SR transmission over the OBSS packet transmission. Otherwise, if the obtained RSSI value of the OBSS packet is at or above the computed OBSS/PD threshold value, second AP 115 may defer.

Figure 3:
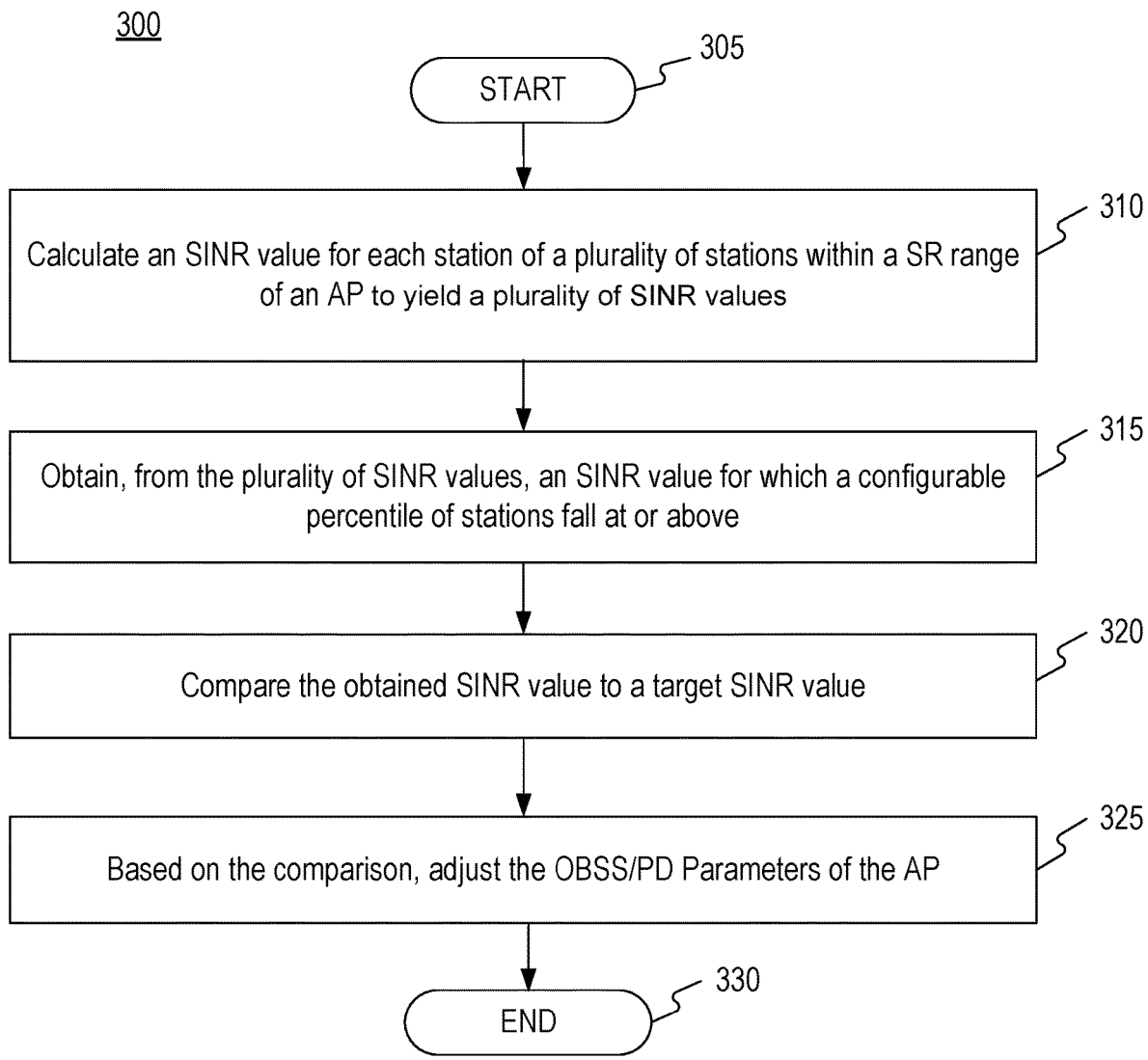
FIG. 3 is a flow chart of a method for performing an SINR calculation for use in dynamically configuring OBSS/PD parameters.

FIG. 3 is a flow chart setting forth the general stages involved in a method 300 consistent with embodiments of the disclosure for performing an SINR calculation for use in dynamically configuring OBSS/PD parameters of an AP, such as second AP 115. Method 300 may be used to at least partially perform stages 215 and 220 of method 200 described with respect to FIG. 2. Method 300 may be implemented using computing device 500 (e.g., second AP 115 or controller 105) as described in more detail below with respect to FIG. 5. Ways to implement the stages of method 300 will be described in greater detail below.

Method 300 may begin at starting block 305 and proceed to stage 310, where an SINR value may be calculated for each station of a plurality of stations (e.g., each client and its associated AP) determined to be within an SR range of an AP (e.g., second AP 115) to yield a plurality of SINR values. The plurality of stations, including first client 125 and its associated first AP 110, may be determined to be within the SR range of second AP 115 based on collected RSSI metrics using techniques described in detail with reference to stage 210 of method 200. The SINR value may be calculated using the respective formulas described in detail with reference to stage 215 of method 200. For example, for each client and its associated AP, the SINR value may be determined based on a DL SINR value measured from the client's location and an UL SINR value measured from the associated AP's location. The DL SINR value may be calculated using a first DL RSSI value that indicates a signal power at which the respective client receives an intended frame from its associated AP and a second RSSI value that indicates an interference power generated at the respective client if second AP 115 performs the SR transmission. The UL SINR value may be calculated using a first UL RSSI value that indicates a signal power at which an associated AP receives an intended frame from the respective client and a second RSSI value that indicates an interference power generated at the associated AP if second AP 115 performs the SR transmission.

Once the plurality of SINR values are calculated for each station at stage 310, method 300 may advance to stage 315, where an SINR value for which a configurable percentile of stations fall at or above may be obtained from the plurality of SINR values. As one example, the configurable percentile of stations may be a $90^{th}$ percentile of stations. Thus, the SINR value obtained is a value (x) and at least 90% of the stations have an SINR value of x or higher.

At stage 320, the SINR value is compared to a target SINR value. As previously discussed, the target SINR value may be a predefined value based on an acceptable level of interference or impact on the stations when balanced against the performance benefits achieved by enabling the AP to perform SR transmission. Thus, for optimal SR transmission, it is desirable for a relatively high (albeit configurable) percentile of stations to have an SINR value that is at or above the target SINR value.

Following the comparison at stage 320, method 300 may advance to stage 325 where the OBSS/PD parameters of the AP (e.g., second AP 115) may be adjusted based on the comparison. For example, if the SINR value is lower than the target SINR value, then the currently set OBSS/PD parameters may be adjusted to be more conservative and restrict a number of instances of SR transmission that may occur to lower the interference or impact on the stations. Alternatively, if the SINR value is higher than the target SINR value, then the currently set OBSS/PD parameters may be adjusted to be more aggressive and allow more instances of SR transmission to occur because additional interference on the stations may be acceptable in view of the benefits that will be achieved by enabling more SR transmissions. In further examples, if the SINR value is equal to the target SINR value, then the OBSS/PD parameters may be maintained rather than adjusted.

Method 300 may then end at stage 330.

Figure 4:
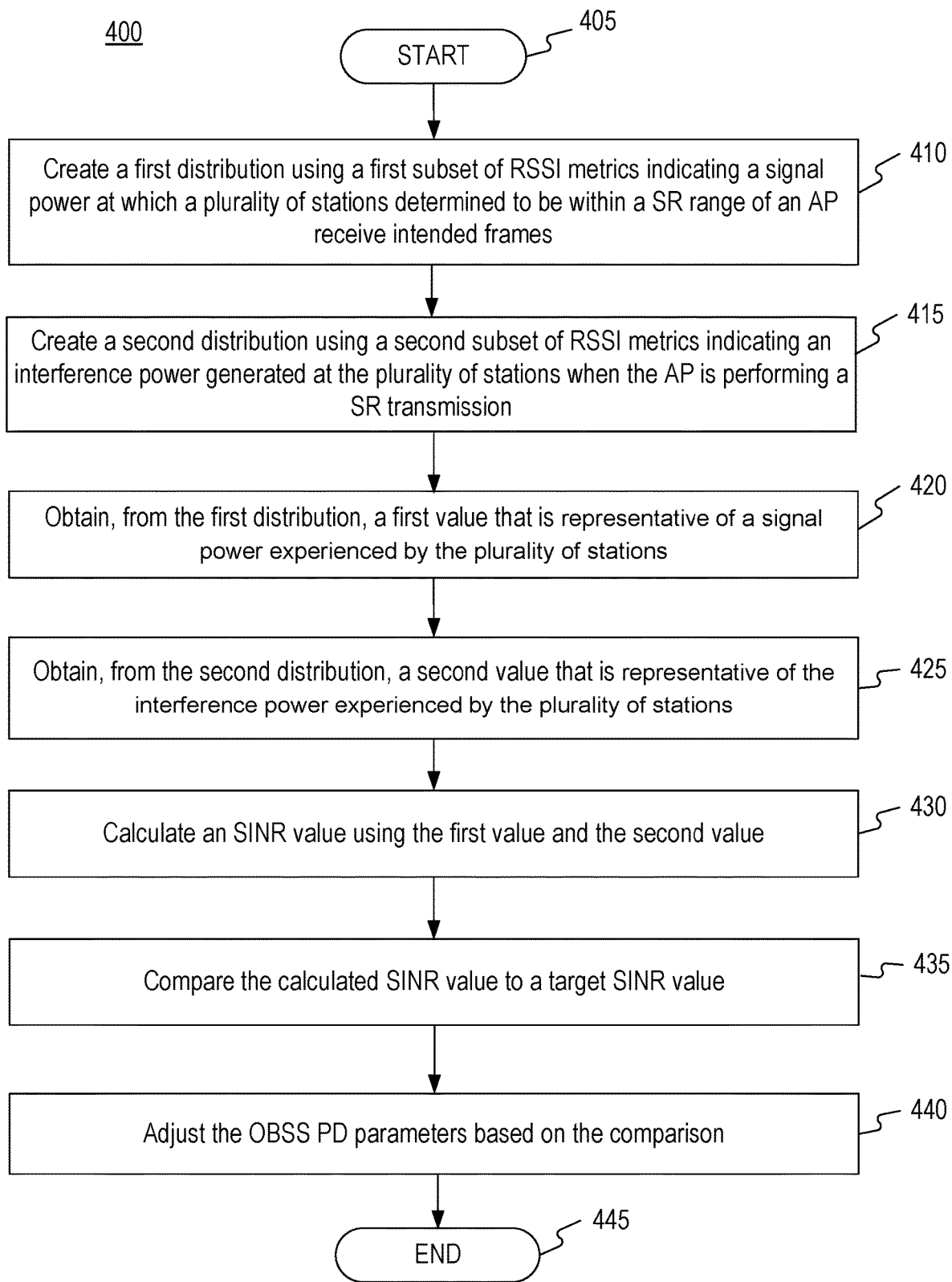
FIG. 4 is a flow chart of another method for performing an SINR calculation for use in dynamically configuring OBSS/PD parameters.

FIG. 4 is a flow chart setting forth the general stages involved in another method 400 consistent with embodiments of the disclosure for performing an SINR calculation for use in dynamically configuring OBSS/PD parameters for an AP, such as second AP 115. Method 400 may be used to at least partially perform stages 215 and 220 of method 200 described with respect to FIG. 2. Method 400 may be implemented using computing device 500 (e.g., second AP 115 or controller 105) as described in more detail below with respect to FIG. 5. Ways to implement the stages of method 400 will be described in greater detail below.

Prior to method 400, a plurality of stations may be determined to be within an SR range of an AP, such as second AP 115, based on collected RSSI metrics using techniques described in detail with reference to stage 210 of method 200. For example, first client 125 and first AP 110 may be determined to be within the SR range of second AP 115.

Method 400 may begin at starting block 405 and proceed to stage 410, where a first distribution is created using a first subset of the RSSI metrics indicating a signal power at which the plurality of stations determined to be within the SR range of the AP receive intended frames (e.g., non-SR frames). The first subset of RSSI metrics may include DL RSSI values associated with the clients within the SR range indicating the strength or signal power at which the respective client receives an intended frame from an associated AP, such as a signal power at which first client 125 receives frame 155 from first AP 110. The first subset of RSSI metrics may also include UL RSSI values associated with the APs within the SR range indicating a strength or signal power at which a respective AP, such as first AP 110, receives a frame from a client device with which it is associated, such as first client 125. In some examples, the first distribution created may be a histogram.

Method 400 may then proceed to stage 415 where a second distribution may be created using a second subset of RSSI metrics indicating an interference power generated at the plurality of stations within the SR range of the AP when the AP is performing an SR transmission (e.g., when second AP 115 is transmitting a frame to second client 130). For example, the second subset of RSSI metrics may indicate a strength at which the plurality of stations hear the frame (e.g., the OBSS SR frame) that is being transmitted from the AP during SR transmission, where the strength is indicative of an interference power generated at the stations.

The second subset of RSSI metrics may include RSSI values associated with the clients within the SR range indicating the strength at which the respective client, such as first client 125, hears second AP 115 (e.g., AP to client RSSI values obtained from client generated beacon reports). The second subset of RSSI metrics may also include RSSI values associated with the APs within the SR range indicating the strength at which the respective AP, such as first AP 110, hears second AP 115 (e.g., AP to AP RSSI values obtained using NDP). Similar to the first distribution, the second distribution may be a histogram.

Once the first distribution and second distribution are created at stage 410 and 415, respectively, method 400 may proceed to stage 420 where a first value is obtained from the first distribution that is representative of a signal power experienced by the plurality of stations. For example, the first value may be a first RSSI value obtained from the first distribution in association with a configurable percentile of the plurality of stations. In one example, the configurable percentile may be a $90^{th}$ percentile of the plurality of station. In other examples, the percentile may be lower or higher dependent on how conservative or aggressive the OBSS/PD parameters are being dynamically configured.

At stage 425, a second value is obtained from the second distribution that is representative of the interference power experienced by the plurality of stations. For, example, the second value may represent a second RSSI value obtained from the second distribution in association with a configurable percentile of the plurality of stations. In one example, the configurable percentile may be a $90^{th}$ percentile of the plurality of station. In other examples, the percentile may be lower or higher dependent on how conservative or aggressive the OBSS/PD parameters are being dynamically configured.

Once the first value and the second value have been obtained at stage 420 and 425, respectively, method 400 may proceed to stage 430 where an SINR value is calculated using the first value and the second value to determine an average SINR impact to the plurality of stations. For example, the SINR value may be calculated as follows:

$$\text{SINR} = \text{first value}/(\text{second value} + \text{noise}),$$

where noise may be a constant value (e.g., thermal noise) and/or may be based on other environmental noise factors.

Once the SINR value is calculated at stage 430, method 400 may proceed to stage 435 where the calculated SINR value may be compared to a target SINR value. As previously discussed, the target SINR value may be a predefined value that is based on an acceptable level of interference or impact on the stations when balanced against the performance benefits achieved by enabling the AP to perform SR transmission. Thus, for optimal SR transmission, it is desirable for the SINR value representing the average impact on the stations to be at the target SINR value.

Therefore, at stage 440, OBSS/PD parameters of the AP may be adjusted based on the comparison. For example, if the SINR value is lower than the target SINR value, then the OBSS/PD parameters currently configured for the AP may be adjusted to be more conservative and restrict a number of instances of SR transmission that may occur to lower the interference or impact on the stations. Alternatively, if the SINR value is higher than the target SINR value, then the OBSS/PD parameters currently configured for the AP may be adjusted to be more aggressive and allow more instances of SR transmission to occur. In further examples, if the SINR impact is equal to the target SINR value, then the OBSS/PD parameters may be maintained rather than adjusted.

Method 400 may then end at stage 445.

Figure 5:
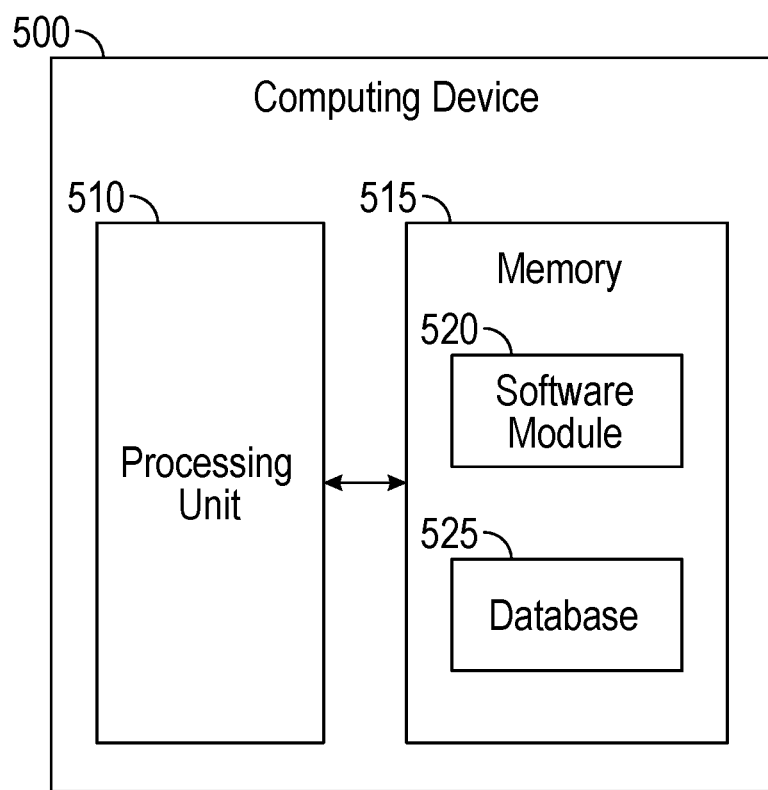
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for dynamically configuring OBSS/PD parameters for an AP as described above with respect to FIG. 2, FIG. 3, and FIG. 4. Computing device 500, for example, may provide an operating environment for controller 105, first AP 110, second AP 115, and third AP 120. Controller 105, first AP 110, second AP 115, and third AP 120 may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with respect to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    determining, by a computing device, a plurality of stations within a Spatial Reuse (SR) range of an Access Point (AP);
    performing Signal to Interference plus Noise Ratio (SINR) calculations associated with the plurality of stations to determine an SINR impact on the plurality of stations if the AP performs an SR transmission given Overlapping Basic Set Service Preamble Detect (OBSS/PD) parameters currently configured for the AP, wherein performing the SINR calculations comprises:
    creating a first distribution using a first subset of Received Signal Strength Indicator (RSSI) metrics indicating a signal power at which the plurality of stations receive intended packets,
    creating a second distribution using a second subset of RSSI metrics indicating an interference power generated at the plurality of stations if the AP performs the SR transmission,
    obtaining, from the first distribution, a first RSSI value that is representative of the signal power experienced by the plurality of stations, obtaining, from the second distribution, a second RSSI value that is representative of the interference power experienced by the plurality of stations,
calculating an SINR value using the first RSSI value and the second RSSI value,
comparing the SINR value to a target SINR value; and
based on the SINR calculations, dynamically adjusting the OBSS/PD parameters for the AP.

2. The method of claim 1, wherein one or more of the first distribution and the second distribution are histograms.

3. The method of claim 1, wherein the determined SINR impact is quantified as an SINR value, and dynamically adjusting the OBSS/PD parameters for the AP comprises:
comparing the SINR value to the target SINR value;
if the SINR value is lower than the target SINR value, adjusting the OBSS/PD parameters to restrict instances of SR transmission;
if the SINR value is higher than the target SINR value, adjusting the OBSS/PD parameters to allow increased instances of SR transmission; and
if the SINR value equals the target SINR value maintaining the OBSS/PD parameters.

4. The method of claim 1, wherein the OBSS/PD parameters include an OBSS/PD minimum value and an OBSS/PD maximum value, and dynamically adjusting the OBSS/PD parameters comprises adjusting one or more of the OBSS/PD minimum value and the OBSS/PD maximum value.

5. The method of claim 4, wherein the OBSS/PD parameters include a first set of OBSS/PD minimum and maximum values to be applied in an OBSS/PD threshold computation when an Overlapping Basic Service Set (OBSS) packet is transmitted by another AP that forms a Spatial Reuse Group (SRG) with the AP, and dynamically adjusting the OBSS/PD parameters comprises adjusting one or more of the OBSS/PD minimum value and the OBSS/PD maximum value within the first set.

6. The method of claim 4, wherein the OBSS/PD parameters include a second set of OBSS/PD minimum and maximum values to be applied in an OBSS/PD threshold computation when an Overlapping Basic Service Set (OBSS) packet is transmitted by another AP that does not form a Spatial Reuse Group (SRG) with the AP, and dynamically adjusting the OBSS/PD parameters comprises adjusting an OBSS/PD maximum value within the second set.

7. The method of claim 1, wherein the plurality of stations include APs and clients, and determining the plurality of stations within the SR range of the AP comprises:
collecting RSSI metrics including at least one of: AP to AP RSSI values, AP to client RSSI values, and client to AP RSSI values; and
identifying the plurality of stations associated with RSSI metrics that fall within the SR range of the AP, wherein the SR range includes an upper bound and a configurable lower bound of RSSI values.

8. An apparatus comprising:
a memory storage; and
a processing unit coupled to the memory storage, wherein the processing unit is operative to:
determine a plurality of stations within a Spatial Reuse (SR) range of an Access Point (AP);
perform Signal to Interference plus Noise Ratio (SINR) calculations associated with the plurality of stations to determine an SINR impact on the plurality of stations if the AP performs an SR transmission given Overlapping Basic Set Service Preamble Detect (OBSS/PD) parameters currently configured for the AP, wherein the processing unit being operative to perform the SINR calculations comprises the processing unit being operative to:
create a first distribution using a first subset of Received Signal Strength Indicator (RSSI) metrics indicating a signal power at which the plurality of stations receive intended packets,
create a second distribution using a second subset of RSSI metrics indicating an interference power generated at the plurality of stations if the AP performs the SR transmission,
obtain, from the first distribution, a first RSSI value that is representative of the signal power experienced by the plurality of stations,
obtain, from the second distribution, a second RSSI value that is representative of the interference power experienced by the plurality of stations,
calculate an SINR value using the first RSSI value and the second RSSI value,
compare the SINR value to a target SINR value; and
based on the SINR calculations, dynamically adjust the OBSS/PD parameters for the AP.

9. The apparatus of claim 8, wherein one or more of the first distribution and the second distribution are histograms.

10. The apparatus of claim 8, wherein the determined SINR impact is quantified as an SINR value, and the processing unit being operative to dynamically adjust the OBSS/PD parameters for the AP comprises the processing unit being operative to:
compare the SINR value to the target SINR value;
if the SINR value is lower than the target SINR value, adjust the OBSS/PD parameters to restrict instances of SR transmission;
if the SINR value is higher than the target SINR value, adjust the OBSS/PD parameters to allow increased instances of SR transmission; and
if the SINR value equals the target SINR value maintain the OBSS/PD parameters.

11. The apparatus of claim 8, wherein the OBSS/PD parameters include an OBSS/PD minimum value and an OBSS/PD maximum value, and the processing unit being operative to dynamically adjust the OBSS/PD parameters comprises the processing unit being operative to adjust one or more of the OBSS/PD minimum value and the OBSS/PD maximum value.

12. The apparatus of claim 11, wherein the OBSS/PD parameters include a first set of OBSS/PD minimum and maximum values to be applied in an OBSS/PD threshold computation when an Overlapping Basic Service Set (OBSS) packet is transmitted by another AP that forms a Spatial Reuse Group (SRG) with the AP, and the processing unit being operative to dynamically adjust the OBSS/PD parameters comprises the processing unit being operative to adjust one or more of the OBSS/PD minimum value and the OBSS/PD maximum value within the first set.

13. The apparatus of claim 11, wherein the OBSS/PD parameters include a second set of OBSS/PD minimum and maximum values to be applied in an OBSS/PD threshold computation when an Overlapping Basic Service Set (OBSS) packet is transmitted by another AP that does not form a Spatial Reuse Group (SRG) with the AP, and the processing unit being operative to dynamically adjust the OBSS/PD parameters comprises the processing unit being operative to adjust an OBSS/PD maximum value within the second set.

14. A non-transitory computer-readable medium storing a set of instructions that, when executed by a processing unit, causes the processing unit to be operative to:
  determining, by a computing device, a plurality of stations within a Spatial Reuse (SR) range of an Access Point (AP);
  performing Signal to Interference plus Noise Ratio (SINR) calculations associated with the plurality of stations to determine an SINR impact on the plurality of stations if the AP performs an SR transmission given Overlapping Basic Set Service Preamble Detect (OBSS/PD) parameters currently configured for the AP, wherein performing the SINR calculations comprises:
    creating a first distribution using a first subset of Received Signal Strength Indicator (RSSI) metrics indicating a signal power at which the plurality of stations receive intended packets,
    creating a second distribution using a second subset of RSSI metrics indicating an interference power generated at the plurality of stations if the AP performs the SR transmission,
    obtaining, from the first distribution, a first RSSI value that is representative of the signal power experienced by the plurality of stations,
    obtaining, from the second distribution, a second RSSI value that is representative of the interference power experienced by the plurality of stations,
    calculating an SINR value using the first RSSI value and the second RSSI value,
    comparing the SINR value to a target SINR value; and
    based on the SINR calculations, dynamically adjusting the OBSS/PD parameters for the AP.

15. The non-transitory computer-readable medium of claim 14, wherein one or more of the first distribution and the second distribution are histograms.

16. The non-transitory computer-readable medium of claim 14, wherein the determined SINR impact is quantified as an SINR value, and dynamically adjusting the OBSS/PD parameters for the AP comprises:
  comparing the SINR value to the target SINR value;
  if the SINR value is lower than the target SINR value, adjusting the OBSS/PD parameters to restrict instances of SR transmission;
  if the SINR value is higher than the target SINR value, adjusting the OBSS/PD parameters to allow increased instances of SR transmission; and
  if the SINR value equals the target SINR value maintaining the OBSS/PD parameters.

17. The non-transitory computer-readable medium of claim 14, wherein the OBSS/PD parameters include an OBSS/PD minimum value and an OBSS/PD maximum value, and dynamically adjusting the OBSS/PD parameters comprises adjusting one or more of the OBSS/PD minimum value and the OBSS/PD maximum value.

18. The non-transitory computer-readable medium of claim 17, wherein the OBSS/PD parameters include a first set of OBSS/PD minimum and maximum values to be applied in an OBSS/PD threshold computation when an Overlapping Basic Service Set (OBSS) packet is transmitted by another AP that forms a Spatial Reuse Group (SRG) with the AP, and dynamically adjusting the OBSS/PD parameters comprises adjusting one or more of the OBSS/PD minimum value and the OBSS/PD maximum value within the first set.

19. The non-transitory computer-readable medium of claim 17, wherein the OBSS/PD parameters include a second set of OBSS/PD minimum and maximum values to be applied in an OBSS/PD threshold computation when an Overlapping Basic Service Set (OBSS) packet is transmitted by another AP that does not form a Spatial Reuse Group (SRG) with the AP, and dynamically adjusting the OBSS/PD parameters comprises adjusting an OBSS/PD maximum value within the second set.

20. The non-transitory computer-readable medium of claim 14, wherein the plurality of stations include APs and clients, and determining the plurality of stations within the SR range of the AP comprises:
  collecting RSSI metrics including at least one of: AP to AP RSSI values, AP to client RSSI values, and client to AP RSSI values; and
  identifying the plurality of stations associated with RSSI metrics that fall within the SR range of the AP, wherein the SR range includes an upper bound and a configurable lower bound of RSSI values.

\* \* \* \* \*